United States Patent
Sugiyama

(10) Patent No.: US 9,588,359 B2
(45) Date of Patent: Mar. 7, 2017

(54) OPTICAL MODULE

(71) Applicant: Fujitsu Optical Components Limited, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 16 days.

(21) Appl. No.: 14/629,992

(22) Filed: Feb. 24, 2015

(65) Prior Publication Data

US 2015/0253593 A1 Sep. 10, 2015

(30) Foreign Application Priority Data

Mar. 7, 2014 (JP) .................... 2014-044606

(51) Int. Cl.
| | |
|---|---|
| *G02F 1/01* | (2006.01) |
| *G02F 1/225* | (2006.01) |
| *G02B 6/42* | (2006.01) |
| *G02F 1/03* | (2006.01) |
| *G02F 1/035* | (2006.01) |
| *G02F 1/21* | (2006.01) |

(52) U.S. Cl.
CPC .......... *G02F 1/0121* (2013.01); *G02B 6/42* (2013.01); *G02F 1/0327* (2013.01); *G02F 1/0356* (2013.01); *G02F 1/2252* (2013.01); *G02F 1/2255* (2013.01); *G02F 2001/212* (2013.01)

(58) Field of Classification Search
None
See application file for complete search history.

(56) References Cited

U.S. PATENT DOCUMENTS

| | | | | |
|---|---|---|---|---|
| 6,033,126 A | * | 3/2000 | Omori ................... | G02F 1/0356 385/3 |
| 8,854,836 B2 | * | 10/2014 | Deng ..................... | G02B 6/428 361/807 |
| 9,231,728 B2 | * | 1/2016 | Sugiyama ............... | H04J 14/06 |
| 2003/0030516 A1 | * | 2/2003 | Tsukiyama .............. | H01L 23/66 333/247 |
| 2007/0200218 A1 | * | 8/2007 | Mukaibara ........... | H05K 1/0233 257/691 |
| 2011/0157673 A1 | * | 6/2011 | Mitomi ................ | G02F 1/2255 359/279 |
| 2012/0051683 A1 | | 3/2012 | Sugiyama | |
| 2014/0119686 A1 | * | 5/2014 | Sugiyama ............. | G02F 1/2255 385/2 |
| 2015/0253592 A1 | * | 9/2015 | Sugiyama ............. | G02F 1/0121 385/40 |
| 2015/0334838 A1 | * | 11/2015 | Ogawa .................... | H01L 31/02 361/760 |
| 2016/0011487 A1 | * | 1/2016 | Sugiyama ............... | G02F 1/225 385/3 |

FOREIGN PATENT DOCUMENTS

| | | |
|---|---|---|
| JP | 2001-083908 | 3/2001 |
| JP | 2012-048121 | 3/2012 |

* cited by examiner

*Primary Examiner* — Tina Wong
(74) *Attorney, Agent, or Firm* — Staas & Halsey LLP

(57) ABSTRACT

An optical module includes: a substrate; a first terminal; a plurality of second terminals; a plurality of third terminals; and a plurality of wirings. The plurality of second terminals are on the substrate. The plurality of third terminals are disposed closer to an electrode than the plurality of second terminals on the substrate. The plurality of wirings extend from the plurality of second terminals through a side opposite to the first terminal and reach the electrode.

6 Claims, 7 Drawing Sheets

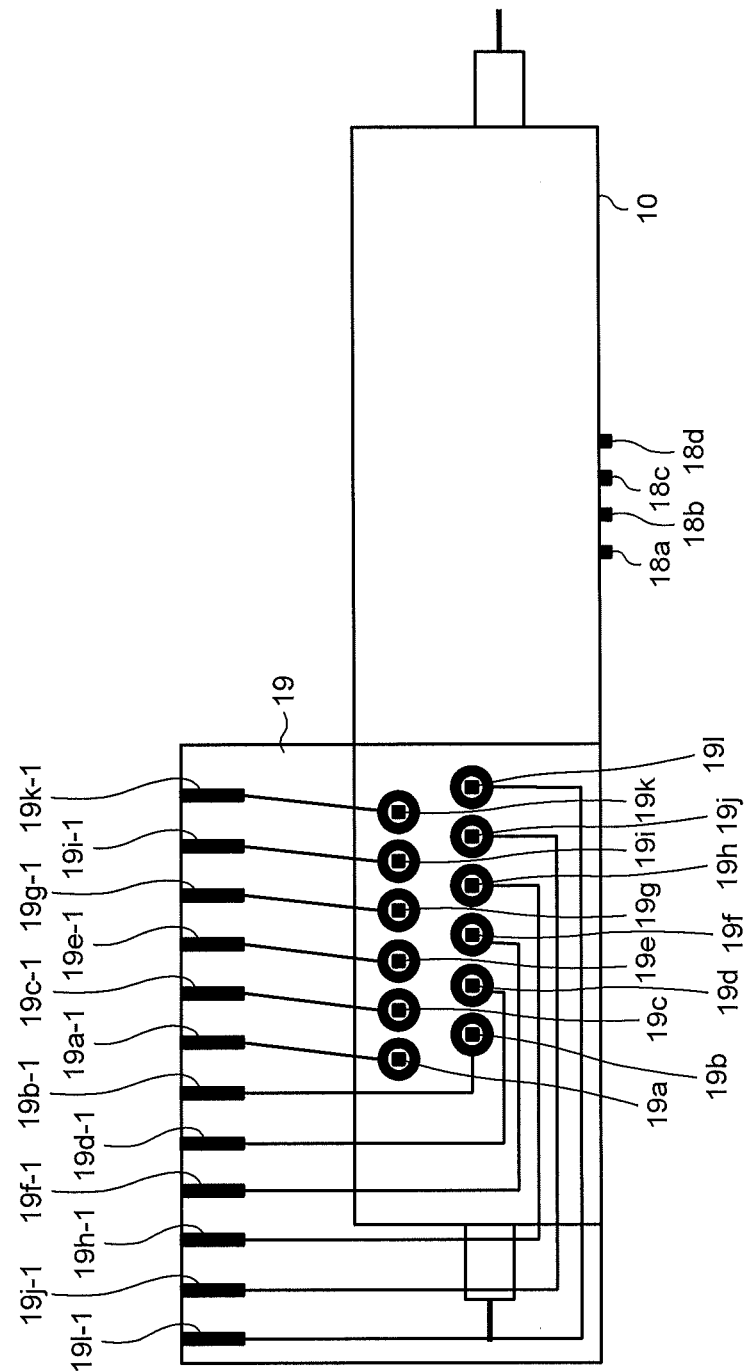

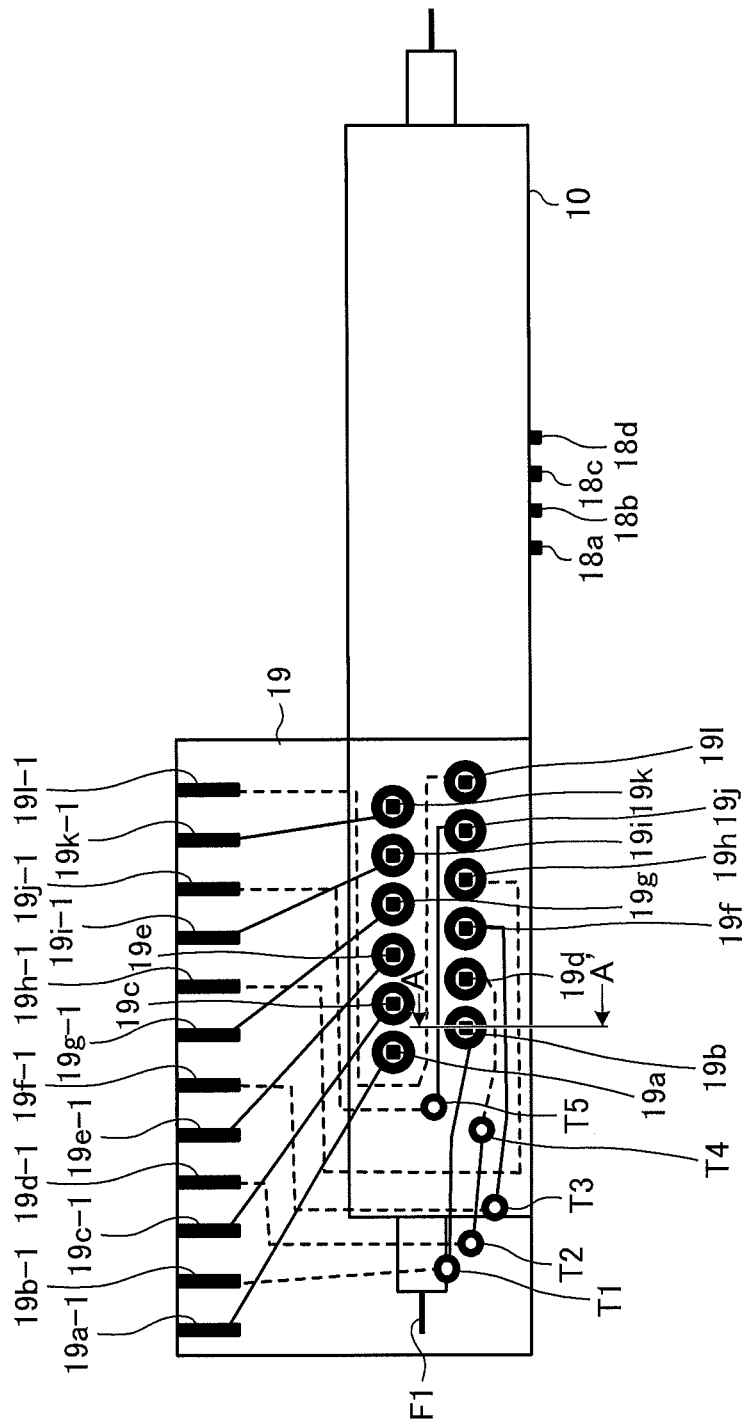

OPTICAL MODULE

CROSS-REFERENCE TO RELATED APPLICATION

This application is based upon and claims the benefit of priority of the prior Japanese Patent Application No. 2014-044606, filed on Mar. 7, 2014, the entire contents of which are incorporated herein by reference.

FIELD

The embodiments discussed herein are related to an optical module.

BACKGROUND

In recent years, along with an increase in the scale of an optical transmission system, a size reduction in an optical module constituting the system has been demanded. While the optical module includes an optical modulator chip and electrical interfaces, the size of the electrical interface becomes a factor for determining the size of the optical module along with a size reduction of the optical modulator chip. The electrical interfaces are classified into an RF (Radio Frequency) pin to be connected to an RF electrode for a high-speed signal and a DC (Direct Current) pin to be connected to a DC electrode for controlling the optical modulator chip. More specifically, an RF signal is inputted from the RF pin provided on a side surface or bottom surface of a package and inputted into the RF electrode of the optical modulator chip via a relay board. Similarly, a DC signal is inputted from the DC pin provided on the side surface or bottom surface of the package and inputted into the DC electrode of the optical modulator chip via the relay board.

Patent Document 1: Japanese Laid-open Patent Publication No. 2012-048121 and Patent Document 2: Japanese Laid-open Patent Publication No. 2001-083908 are introduced as the Related Art Document.

Since four signals at 32 Gbps are inputted into the RF pin of the electrical interfaces, four RF pins are provided in the package. If the interval between these four RF pins is reduced in order to reduce the size of the optical module, however, crosstalk between the RF pins (channels) is increased. Therefore, in order to achieve a size reduction of the electrical interfaces, how much the interval between the DC pins can be reduced while keeping the interval between the RF pins at a level satisfying the characteristic impedance becomes important.

For example, twelve DC pins are arranged horizontally in a row on an FPC (Flexible Printed Circuit) provided in the package. This becomes a factor for complicating a size reduction in the optical module. In view of this, reducing the horizontal width of the FPC by arranging the DC pins in two rows is effective in reducing the size of the optical module. However, in a configuration where wirings extending from the DC pins in the outer row go through between the DC pins in the center-side (DC electrode side) row, the interval between the DC pins needs to be set large. This imposes a limitation on the size reduction of the optical module.

In view of this, if the wirings extending from the DC pins in the outer row are set so as to circumvent an outer side of the DC pins at the both ends in the center-side (DC electrode side) row, the optical module can connect the DC pins to the corresponding DC electrodes without increasing the interval between the DC pins. According to this configuration, however, the arrangement of the DC electrodes is different from the arrangement of the DC pins. Therefore, compatibility with the related DC electrode arrangement is not ensured. Moreover, since the FPC with the DC pins disposed thereon is extended toward the RF pin due to the above-described circumvention of the wirings, crosstalk between a DC signal and an RF signal is generated.

SUMMARY

According to an aspect of the embodiments, an optical module includes: a substrate; a first terminal; a plurality of second terminals on the substrate; a plurality of third terminals disposed closer to an electrode than the plurality of second terminals on the substrate; and a plurality of wirings that extend from the plurality of second terminals through a side opposite to the first terminal and reach the electrode.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1B is a side view illustrating the configuration of the optical module according to the present embodiment;

FIG. 2 is a side view illustrating a configuration of an optical module according to a first modified embodiment;

DESCRIPTION OF EMBODIMENTS

Preferred embodiments will be explained with reference to accompanying drawings. Note that the optical module disclosed by the present application shall not be limited by the following embodiments.

Figure 1A:
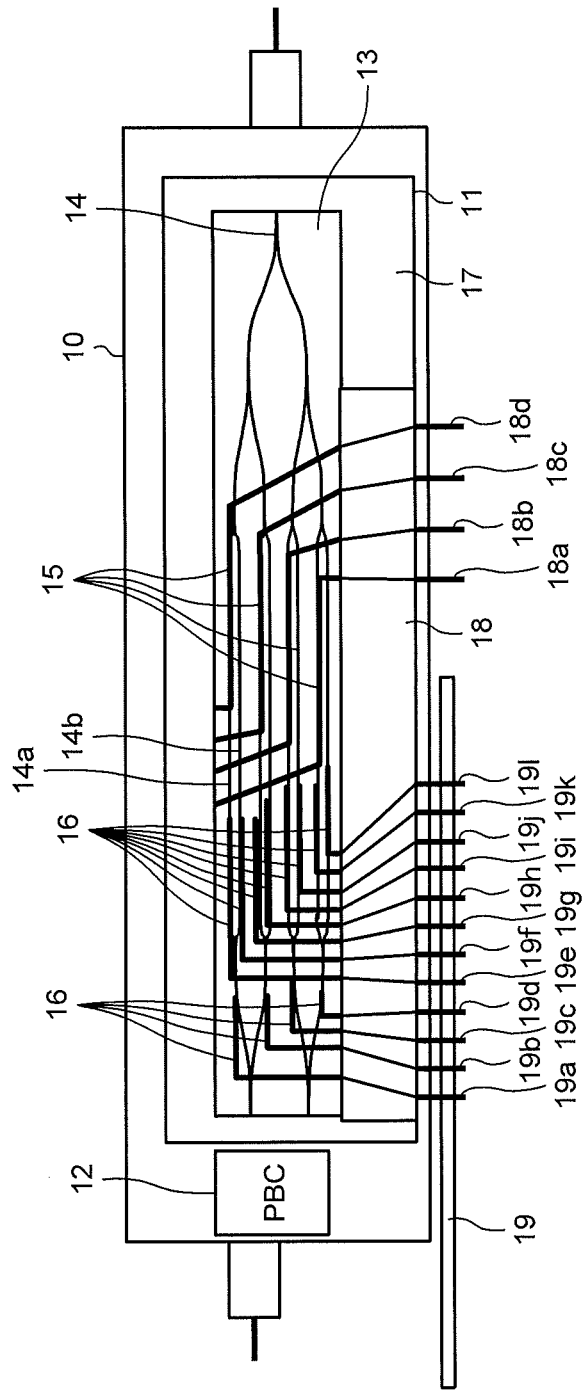
FIG. 1A is a top view illustrating a configuration of an optical module according to a present embodiment.

A configuration of an optical module according to an embodiment disclosed by the present application will be described first. FIG. 1A is a top view illustrating the configuration of an optical module 10 according to the present embodiment. As illustrated in FIG. 1A, the optical module 10 includes a package 11 and a PBC (Polarization Beam Coupler) 12. Electrodes 15 and 16 are provided in the vicinity of an optical waveguide 14 formed on a crystal substrate 13 inside the package 11. The crystal substrate 13 is made of an electro-optic crystal such as $LiNbO_3$ (LN) or $LiTaO_2$. The optical waveguide 14 is formed by forming a metal film such as Ti and subjecting the metal film to thermal diffusion or by performing patterning and then proton exchange in benzoic acid. The optical waveguide 14 constitutes a Mach-Zehnder interference system and the electrodes 15 and 16 are provided on the parallel waveguides of the Mach-Zehnder.

Since the electrodes 15 and 16 utilize a refractive index change due to an electric field in a z-axis direction, the electrodes 15 and 16 are disposed directly above the optical waveguide 14. The electrodes 15 and 16 are coplanar electrodes each formed by patterning a signal electrode and a ground electrode on the optical waveguide 14. In order to prevent light propagating through the optical waveguide 14 to be absorbed by the signal electrode and the ground electrode, the optical module 10 includes a buffer layer between the crystal substrate 13 and the electrodes 15 and 16. The buffer layer is made of $SiO_2$ or the like with a thickness of about 0.2 to 2 µm. The crystal substrate 13 may be a III-V group semiconductor such as InP or GaAs.

When the optical module 10 is driven at high speed, terminations of the signal electrode and the ground electrode are connected to each other with a resistor so as to form a traveling-wave electrode and a microwave signal is applied from an input side thereof. At this time, the refractive indexes of the two optical waveguides 14 (for example, optical waveguides 14a and 14b) constituting the Mach-Zehnder are changed such as by +Δna and −Δnb, respectively, due to the electric field. Along with such a change, a phase difference between the optical waveguides 14 is also changed. As a result, phase-modulated signal light is outputted from the optical waveguide 14 due to Mach-Zehnder interference. The optical module 10 can obtain a high-speed optical response property by controlling the effective refractive index of the microwave by means of changing a cross-sectional shape of the electrodes 15 and 16 so as to match the speeds of the light and the microwave.

A TEC (Thermo Electric Cooler) 17 is a small cooling device by means of Peltier junction. The TEC 17 adjusts a temperature in the package 11 housing the crystal substrate 13, the optical waveguide 14, and the electrodes 15 and 16. The package 11 is provided with an FPC 19 via a relay board 18. If a high-frequency wave propagation loss is large in the electrode on the FPC 19, the modulation bandwidth is narrowed, thereby increasing the drive voltage thereof. Thus, in the optical module 10 handling high-frequency signals, it is desirable that the FPC 19 have a shortest possible length in order to reduce the high-frequency wave loss.

As illustrated in FIG. 1A, the relay board 18 includes four RF pins 18a to 18d connected to the electrodes 15 in a posterior part of an input-side side surface of the package 11. Moreover, the FPC 19 includes twelve DC pins 19a to 19l connected to the electrodes 16 in an anterior part of the input-side side surface of the package 11.

FIG. 1B is a side view illustrating the configuration of the optical module 10 according to the present embodiment. As illustrated in FIG. 1B, the twelve DC pins 19a to 19l are arranged in two rows on the FPC 19. More specifically, the DC pins 19a, 19c, 19e, 19g, 19i, and 19k are arranged in the upper row and the DC pins 19b, 19d, 19f, 19h, 19j, and 19l are arranged in the lower row. Moreover, wirings extending from the DC pins 19b, 19d, 19f, 19h, 19j, and 19l in the lower row to DC electrodes 19b-1, 19d-1, 19f-1, 19h-1, 19j-1, and 19l-1 are formed so as to circumvent the left side of the DC pin 19a on the left end in the upper row. Therefore, crosstalk between RF signals and DC signals due to interference from the RF pins 18a to 18d is suppressed.

Note that a cover material (for example, a coverlay) may be formed on a front surface or rear surface of the FPC 19 in order to prevent the separation of a DC electrodes 19a-1 to 19l-1 or the wiring pattern.

As described above, the optical module 10 includes the RF pin 18a, the plurality of DC pins 19b and 19d on the FPC 19, the plurality of DC pins 19a and 19c, and the plurality of wirings. The plurality of DC pins 19a and 19c are disposed closer to the electrodes 19a-1 to 19d-1 than the plurality of DC pins 19b and 19d on the FPC 19. The plurality of wirings extend from the plurality of DC pins 19b and 19d through a side opposite to the RF pin 18a and reach the electrodes 19b-1 to 19d-1. For example, the plurality of wirings are formed in the optical module 10 so as to circumvent the farthest DC pin (DC pin 19a) from the RF pin 18a among the plurality of DC pins 19a and 19c. This causes the DC signals flowing from the plurality of DC pins 19b and 19d to be distant from the RF signal flowing from the RF pin 18a, thereby suppressing crosstalk between the signals.

First Modified Embodiment

The first modified embodiment will be described next. An optical module according to the first modified embodiment has a configuration similar to that of the optical module 10 according to the above-described embodiment except for wirings in the FPC 19. Therefore, in the first modified embodiment, components common to those of the above-described embodiment will be denoted by the same reference numerals and the detailed description thereof will be omitted.

FIG. 2 is a side view illustrating the configuration of the optical module 10 according to the first modified embodiment. In FIG. 2, a solid line in the FPC 19 represents a wiring on the front surface thereof whereas a broken line represents a wiring on the rear surface thereof (surface closer to the package 11). As illustrated in FIG. 2, the DC pins 19a, 19c, 19e, 19g, 19i, and 19k in the upper row are connected to the DC electrodes 19a-1, 19c-1, 19e-1, 19g-1, 19i-1, and 19k-1, respectively, via wirings formed on the front surface of the FPC 19. The DC pins 19b, 19d, 19f, 19h, 19j, and 19l in the lower row, on the other hand, are connected to the DC electrodes 19b-1, 19d-1, 19f-1, 19h-1, 19j-1, and 19l-1, respectively, via wirings formed on the both surfaces of the FPC 19. Moreover, in the lower row, only the wirings of the DC pins 19d, 19h, and 19l among the DC pins 19b, 19d, 19f, 19h, 19j, and 19l are formed on the rear surface of the FPC 19 so that adjacent channels are wired on the opposing surfaces of the FPC 19. This makes it possible to increase the interval between the wirings of the adjacent DC pins and thereby reduce crosstalk among signals flowing through the wirings from the DC pins 19b, 19d, 19f, 19h, 19j, and 19l.

Note however that if all of the wirings connecting between the DC pins 19b, 19d, 19f, 19h, 19j, and 19l in the lower row and the DC electrodes 19b-1, 19d-1, 19f-1, 19h-1, 19j-1, and 19l-1 are formed on the rear surface of the FPC 19, crossing of the wirings occurs in the left end portion (light output side) of the FPC 19. In view of this, the FPC 19 is provided with through holes T1 to T5 for connecting between the wirings on the front surface thereof and the wirings on the rear surface thereof. The wiring is changed to the opposite surface as needed. In the example illustrated in FIG. 2, the wiring formed on the rear surface from the DC pin 19d, for example, is formed so as to be transferred once to the front surface via the through hole T4 and returned to the rear surface again by means of the through hole T2. This prevents the wiring connecting between the DC pin 19d and the DC electrode 19d-1 from crossing with the wirings connecting between the DC pins 19f and 19h and the DC electrodes 19f-1 and 19h-1 on the rear surface of the FPC 19. As a result, a short circuit between the wirings is prevented from occurring.

Figure 3:
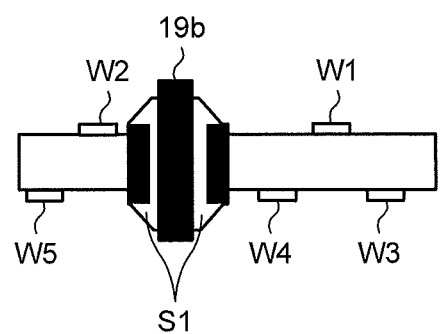
FIG. 3 is a cross-sectional view taken along line A-A' of FIG. 2.

FIG. 3 is a cross-sectional view taken along line A-A' of FIG. 2. As illustrated in FIG. 3, wirings W1 to W5 circumventing the left side of the DC pin 19a are formed alternately on the front surface and the rear surface on both sides of the DC pin 19b. This increases the interval between the adjacent front surface wirings W1 and W2 and the interval between adjacent ones of the rear surface wirings W3 to W5 as compared to when the wirings are provided only on one surface. As a result, crosstalk among the wirings on the FPC 19 is reduced as described above.

According to the optical module 10 of the first modified embodiment, a space in a lower part of the FPC 19 for guiding the wirings from the DC pins 19b, 19d, 19f, 19h, 19j, and 19l in the lower row in the leftward direction is reduced. Therefore, a need to take measures such as enlarging the FPC 19 in the downward direction or disposing the DC pins 19a to 19l at higher positions is eliminated, thereby making it possible to achieve a size reduction of the optical module 10. Moreover, since the arrangement of the DC electrodes 19a-1 to 19l-1 coincides with the arrangement of the DC pins 19a to 19l as illustrated in FIG. 2, compatibility with the related DC electrode arrangement is maintained.

Note that the left end of the FPC 19 is projected more leftward than the output-side interface end of the package 11 in the optical module 10 according to the first modified embodiment since the wirings with the DC pins 19a to 19l being output sources are circumvented. However, the FPC 19 will not interfere with other interfaces when mounted since the left end projected portion of the FPC 19 is located at a position (vacant space) in parallel with the output-side optical fiber F1. In other words, the optical module 10 can achieve a size reduction thereof while suppressing crosstalk between the DC signals and the RF signals by effectively utilizing the limited space in the package 11.

Second Modified Embodiment

The second modified embodiment will be described next. An optical module according to the second modified embodiment has a configuration similar to that of the optical module 10 according to the above-described embodiment except for including power supply lines on the FPC 19. Therefore, in the second modified embodiment, components common to those of the above-described embodiment will be denoted by the same reference numerals and the detailed description thereof will be omitted.

Figure 4A:
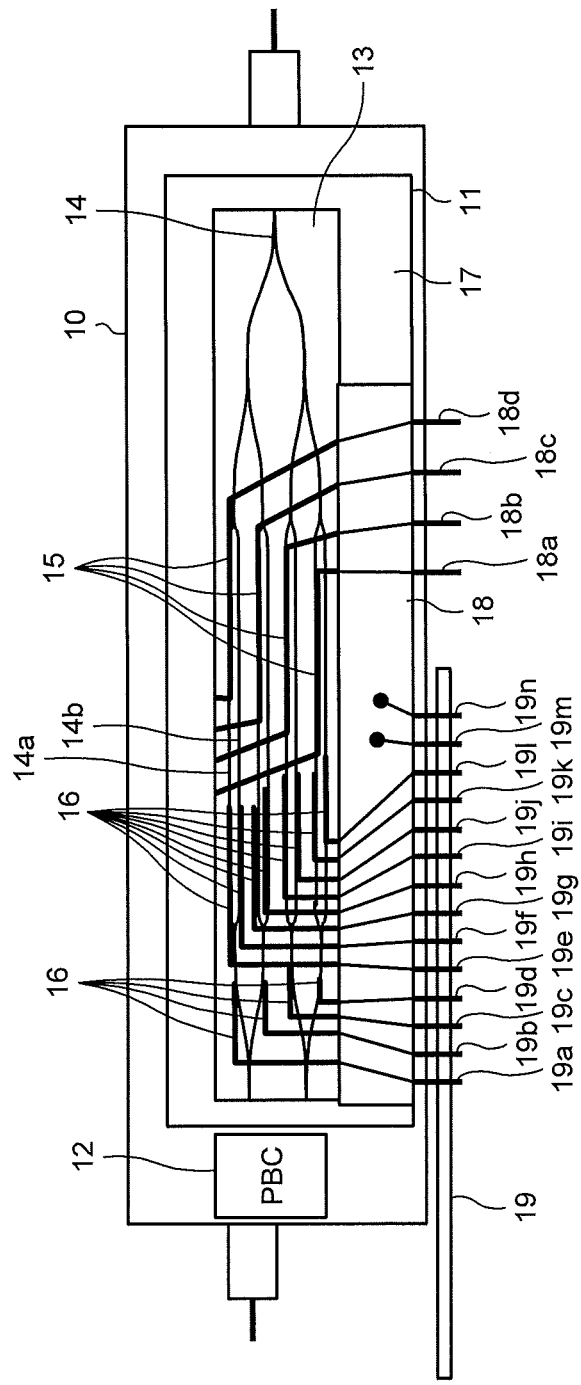
FIG. 4A is a top view illustrating a configuration of an optical module according to a second modified embodiment.
Figure 4B:
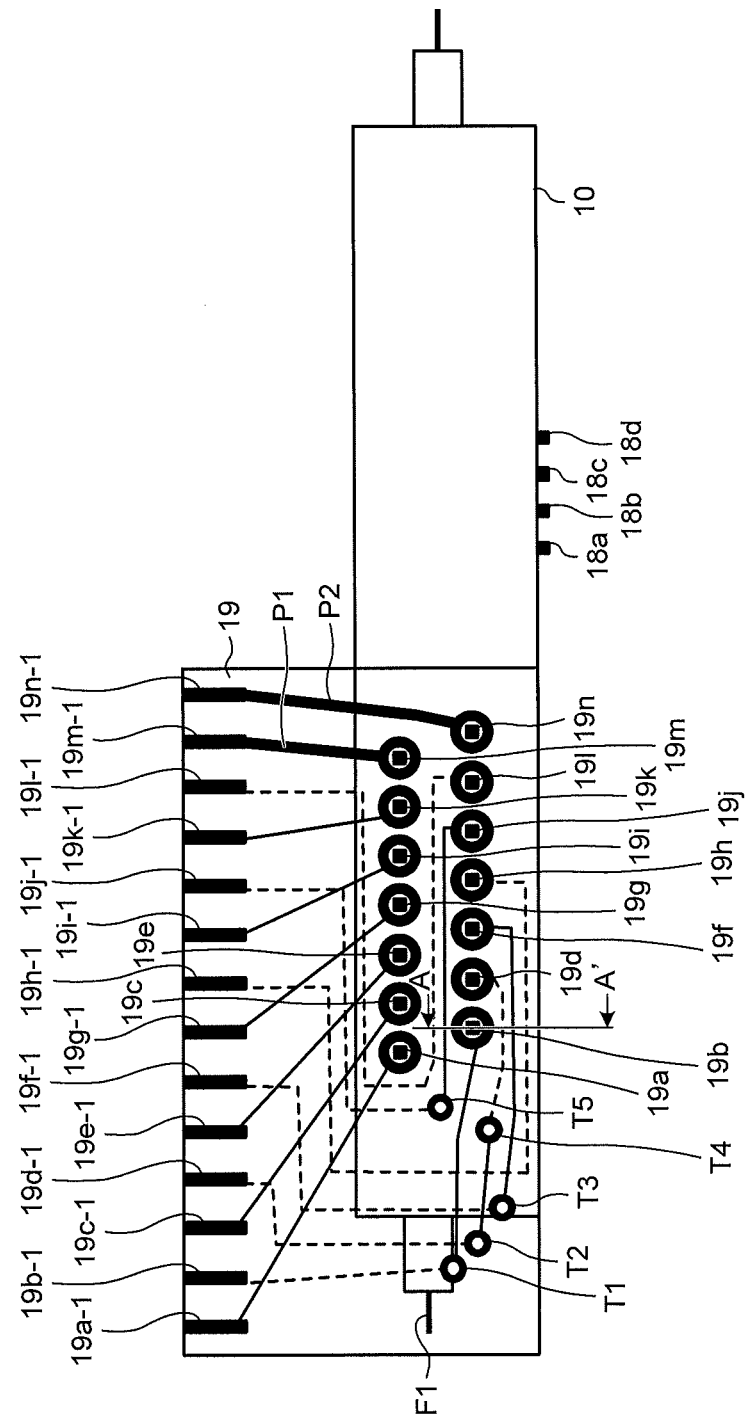
FIG. 4B is a side view illustrating the configuration of the optical module according to the second modified embodiment.

FIG. 4A is a top view illustrating the configuration of the optical module 10 according to the second modified embodiment. As illustrated in FIG. 4A, the FPC 19 is provided with TEC pins 19m and 19n in parallel with the aforementioned twelve DC pins 19a to 19l. The TEC pins 19m and 19n are pins used for supplying a power from outside to the temperature adjustment TEC 17 mounted in the package 11. FIG. 4B is a side view illustrating the configuration of the optical module 10 according to the second modified embodiment. As illustrated in FIG. 4B, power supply lines P1 and P2 connecting between the TEC pins 19m and 19n and TEC electrodes 19m-1 and 19n-1, respectively, are formed on the front surface of the FPC 19. Note that the power supply lines P1 and P2 may be formed on the rear surface (surface closer to the package 11) of the FPC 19.

The power supply lines P1 and P2 have a line width according to an amount of current to be flowed therethrough and a thickness of plating (for example, a width greater than that of the wirings W1 to W5). The width of the power supply lines P1 and P2 is about 300 to 500 μm, for example, whereas the width of other wirings is about 100 μm, for example. Note however that the power supply lines P1 and P2 have difficulty in being wired by means of through holes especially when a current amount thereof is large. Thus, it is desirable that the power supply lines P1 and P2 be formed only on one surface (for example, the front surface) of the FPC 19.

Note that there is a concern about crosstalk between the current flowing through the power supply lines P1 and P2 and the RF signals in the optical module 10 according to the second modified embodiment due to the provision of the power supply lines P1 and P2 in the right end portion of the FPC 19. However, the interference from the RF signals to the current is small as compared to the interference from the RF signals to the DC signals. Thus, the generation of the aforementioned crosstalk is limited.

Application Example

Figure 5:
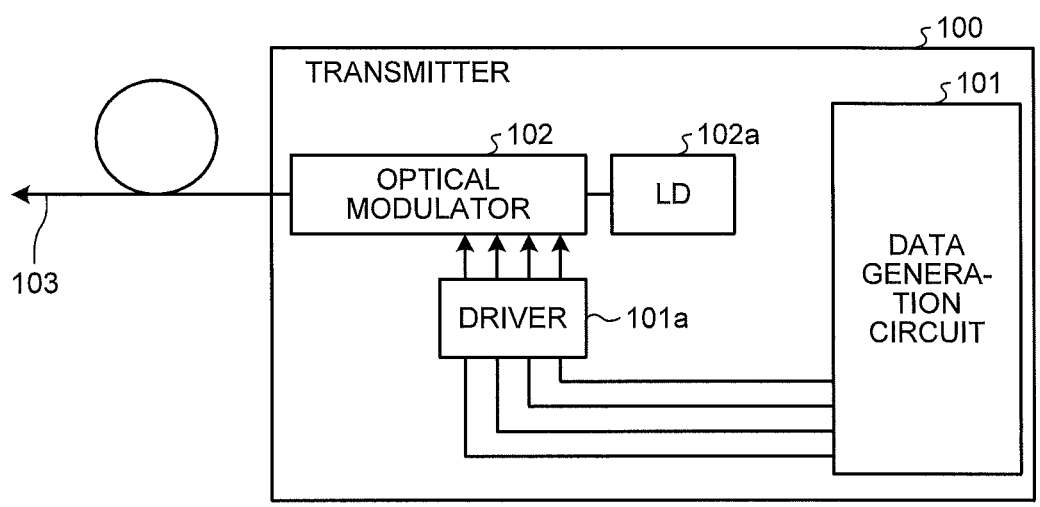
FIG. 5 is a diagram illustrating a configuration of a transmitter in which the optical module according to the aforementioned embodiment and modified embodiments is mounted.

An optical modulator employing the above-described optical module 10 may be effectively applied to a transmitter, for example, since such an optical modulator can simultaneously achieve a crosstalk reduction and high mountability. FIG. 5 is a diagram illustrating a configuration of a transmitter 100 in which the optical module 10 according to any one of the above-described embodiment and modified embodiments is mounted. As illustrated in FIG. 5, the transmitter 100 includes a data generation circuit 101, an optical modulator 102, and an optical fiber 103. Moreover, the data generation circuit 101 includes a driver 101a and the optical modulator 102 includes an LD (Laser Diode) 102a. These components are connected to one another unidirectionally or bidirectionally so as to enable the input and output of various signals or data. Data generated by the data generation circuit 101 is converted from an electric signal into an optical signal by the optical modulator 102. The data is then transmitted to the outside of the device with the optical fiber 103 used as a transmission medium.

In particular, the optical module 10 can be effectively applied to an optical modulator capable of connecting DC pins to a large number of DC electrodes with the use of the FPC 19. Examples of such an optical modulator may include an I/Q (In-phase/Quadrature) optical modulator, a polarization multiplexing optical modulator, an ITXA, an ICR, an optical transmitter and receiver integrated device, and the like. Note that the optical module 10 may be applied to a receiver without being limited to the transmitter.

In the optical module 10 according to any one of the above-described embodiment and modified embodiments, the RF pins 18a to 18d, the DC pins 19a to 19l, and the TEC pins 19m and 19n are arranged on the same side surface of the package 11 in order to reduce the mounting area thereof. Note however that the RF pins 18a to 18d, the DC pins 19a to 19l, and the TEC pins 19m and 19n may be arranged on different surfaces such as on the left side surface and the right side surface, for example. Moreover, the substrate on which the DC pins 19a to 19l and the TEC pins 19m and 19n are arranged may be a PCB, for example, without being limited to the FPC.

Moreover, in the optical module 10 according to the above-described embodiment and modified embodiments, the DC pins 19a to 19l are arranged in two rows of the upper and lower parts on the FPC 19. However, the number of rows may be three or more without being limited to two. For example, when the DC pins 19a to 19l form three rows, wirings from the DC pins in the second row (middle part) and the third row (lowermost part) are formed so as to circumvent the left side of the DC pin on the leftmost end in the first row (uppermost part). This further reduces the horizontal width of the FPC 19, thereby making it possible to achieve a further size reduction of the optical module 10.

Furthermore, the optical module 10 according to the second modified embodiment has wirings such that the arrangement of the DC electrodes 19*a*-1 to 19*l*-1 coincides with the arrangement of the DC pins 19*a* to 19*l*. However, the above-described arrangements are not necessarily caused to coincide with each other (arranged in order) since a size reduction is possible as long as the wirings in the lower row are formed alternately on the front surface and the rear surface of the FPC 19.

Moreover, in the description set forth above, the individual configurations and operations have been described for the embodiment and modified embodiments, respectively. However, the optical modules 10 according to the above-described embodiment and modified embodiments each may also have a component characteristic of the other modified embodiment. Moreover, a combination of the embodiment and modified embodiments can take any configuration such as a combination of three or more without being limited to two. For example, the optical module 10 according to the above-described embodiment may have the TEC pins 19*m* and 19*n*, the power supply lines P1 and P2, and the TEC electrodes 19*m*-1 and 19*n*-1 according to the second modified embodiment on the front surface of the FPC 19. Furthermore, a single optical module 10 may possess all the components described in the aforementioned embodiment and first and second modified embodiments within a compatible range.

According to one aspect of an optical module discussed in the present application, it is possible to suppress crosstalk.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical module comprising:
    a substrate;
    a first terminal;
    a plurality of second terminals on the substrate;
    a plurality of third terminals disposed closer to an electrode than the plurality of second terminals on the substrate; and
    a plurality of wirings that extend from the plurality of second terminals through a side opposite to the first terminal and reach the electrode, wherein
    wirings circumventing the plurality of third terminals are formed alternately on a front surface and a rear surface on both sides of the plurality of second terminals to increase an interval between adjacent front surface wirings and an interval between adjacent ones of rear surface wirings as compared to when wirings are provided only on one surface.

2. The optical module according to claim 1, wherein the plurality of wirings are formed so as to circumvent a third terminal farthest from the first terminal among the plurality of third terminals.

3. The optical module according to claim 1, wherein
    the first terminal is an input terminal for an RF (Radio Frequency) signal, and
    the plurality of second terminals and the plurality of third terminals are input terminals for a DC (Direct Current) signal.

4. The optical module according to claim 1, wherein the plurality of wirings are formed alternately on a front surface and a rear surface of the substrate.

5. The optical module according to claim 1, further including a fourth terminal on the substrate between the first terminal and the plurality of second terminals.

6. The optical module according to claim 5, wherein a wiring from the fourth terminal is formed with a width greater than that of the plurality of wirings.

* * * * *